United States Patent [19]
Folkens et al.

[11] Patent Number: 5,738,330
[45] Date of Patent: Apr. 14, 1998

[54] MACHINERY MOUNT WITH DAMPING MEANS

[75] Inventors: Jerry D. Folkens; Harold E. Reinke, both of DuPage County; Wayne A. Fetters, Will County, all of Ill.

[73] Assignee: Vibro/Dynamics Corp., Broadview, Ill.

[21] Appl. No.: 570,485

[22] Filed: Dec. 11, 1995

[51] Int. Cl.$^6$ .................................................. F16M 11/00
[52] U.S. Cl. ........................ 248/632; 248/636; 767/794
[58] Field of Search .................................. 248/632, 636, 248/637, 562, 566, 638, 634, 635; 267/294, 141.1

[56] References Cited

U.S. PATENT DOCUMENTS

| | | | |
|---|---|---|---|
| 4,679,777 | 7/1987 | Gold et al. | 248/562 |
| 4,708,329 | 11/1987 | Tabata et al. | 248/562 |
| 5,291,967 | 3/1994 | Aoki | 248/562 |
| 5,456,047 | 10/1995 | Dorka | 248/636 |

*Primary Examiner*—Ramon O. Ramirez
*Assistant Examiner*—Willie Berry, Jr.
*Attorney, Agent, or Firm*—R. Jonathan Peters

[57] ABSTRACT

An improved machinery mount for supporting a load on a substructure such as a building floor, having a support member engagable with at least a portion of said load, and a bearing member disposed beneath said support member and spaced therefrom. A damper disposed between the bearing member and the substructure includes a plurality of compressible resilient members and at least one rigid member interposed between the resilient members, the uppermost resilient member disposed adjacent the bearing member and the lowermost resilient member disposed adjacent the substructure. The resilient members, being preferably rubber or plastic, are bonded to the adjacent rigid member, preferably being a metal. Preferably, the damper is secured to the bearing member, and the bearing member is secured to the support member, the three components thereby forming an integral unit.

29 Claims, 4 Drawing Sheets

MACHINERY MOUNT WITH DAMPING MEANS

FIELD OF THE INVENTION

This invention relates to a vibration isolating mount. More specifically, this invention relates to a machinery mount with a vibration damper to substantially deaden vibration caused by external or internal forces.

BACKGROUND AND PRIOR ART

Extremely heavy loads such as machinery, equipment, presses, and the like (hereinafter, including the appended claims, the term "machinery" is used generically and is intended to include all such equipment, apparatus, etc.), are subjected to shock and vibration and are susceptible to misalignment due to these forces and/or due to settling including settling of the foundation. Proper alignment, including leveling, flatness, and the like, is essential in order to operate efficiently, economically and safely.

The prior art discloses various types or designs of adjustable mounts or isolating mounts to correct for out-of-level or out-of-flatness conditions. This prior art includes, for example, U.S. Pat. Nos. 3,332,647 to Young; 4,047,427 to Young; and 4,846,436 to Young et al., which disclose an adjustment member engagable with a support member for the machine footing and maintained in spaced relationship from a bearing member. In U.S. Pat. No. 4,846,436, a hydraulic cylinder is disposed between the support member and bearing member, and when actuated relieves at least a portion of the load assumed by the adjustment member. The adjustment member can now be turned or rotated to adjust the out-of-level condition, and once corrected, the cylinder can be drained and the load returned to the adjustment member.

In addition, it is desirable to protect or isolate the machinery as much as possible from the damaging effects of shock and vibration. Heavy machinery, for example punch presses standing twenty feet or higher and weighing as much as a million pounds or more, can be damaged or become misaligned, and therefore it is necessary to absorb as much of the shock and vibration as possible. In each of the above cited patents, the isolating machinery mount incorporates an elastomeric cushion member, which is positioned below the bearing member and rests on the substructure or floor. In this manner, the machine is protected from undesirable shock and vibrations.

Also, the prior art discloses the general concept of a damper or cushioning device for lessening, controlling or deadening vibrations, which comprises alternating layers of resilient cushions and metal plates. A layered or laminated damper may be advantageous in that the metal plates enhance the stability of the structure. Multiple layers of an elastomer or resilient panel with alternating layers of rigid members are softer or more compressible than a single elastomeric cushion that is equivalent in thickness to a single elastomer of the layered structure and of the same load bearing area. Further, multiple layers of an elastomer with alternating layers of rigid members offer greater load bearing capacity than a single elastomeric cushion that is equivalent in thickness to the sum of the elastomeric members in the layered structure. The particular design or structure, however, can depend upon the end use, especially on the load capacity required. For example, U.S. Pat. No. 5,339,580 discloses a seismic damping device comprising a plurality of elastomeric damper pads 1 having hollow centers and interconnected by steel plates 6, and a steel plate is arranged at the top and bottom of each device.

U.S. Pat. No. 2,661,943 discloses a cushioning device comprising stacked metal plates 10 with corrugations or ribs 11 arranged so that the corrugations are staggered with respect to each plate, and confined by container 12. Resilient blocks or pads 13 are disposed parallel to and between the plates and laterally between the ribs thereby leaving a space between each rib and pad.

A bearing assembly is disclosed in U.S. Pat. No. 5,195,716 for placement beneath machinery. The assembly comprises two or more planar members 2 (metal plates) with interposed disc-shaped elastomeric bearings 3 bonded to the adjacent plates, and a downwardly depending skirt 6. The uppermost plate is bolted to the machine, and the lowermost plate to the floor or foundation.

The present invention has as its purpose to provide a machinery mount having incorporated therein a damper for mounting between the machinery and the substructure (e.g., building floor) to protect the machinery and building from undesirable shock and vibration associated with the use of the machinery.

SUMMARY OF THE INVENTION

In accordance with the present invention, there is provided an improved machinery mount for supporting at least a portion of a load on a substructure such as a building floor. The machinery mount or vibration isolating mount comprises a support member engagable with at least a portion of the load, and a bearing member disposed beneath the support member and spaced therefrom. Further, in a preferred embodiment, the machinery mounting system or isolating mount includes an adjustable member having a portion intermediate the support member and the bearing member for regulating and maintaining the spatial relationship between the bearing member and the support member. A damping means for disposition between the bearing member and the substructure comprises a plurality of compressible resilient members and at least one rigid member interposed between the resilient members and being vertically arrayed, the uppermost resilient member disposed adjacent the bearing member and the lowermost resilient member disposed adjacent the substructure. Preferably, the resilient members are bonded to the adjacent rigid member.

The term "rigid" as used herein and in the appended claims is used to mean rigid in a direction transverse to the load, or is non-pliant in a planar direction relative to the resilient member, that is, parallel to the plane of the resilient member.

In accordance with one embodiment for a machinery mounting system of the present invention, the dampening means includes at least three resilient members and at least two rigid members in alternating relationship. The resilient member is preferably a polymeric material such as a rubber or plastic (e.g., neoprene). The rigid member may be a polymer which is stiffer and more rigid relative to the resilient member, as defined above, such as polyethylene or polyvinyl chloride, or preferably is a metal plate such as a steel plate or the like. Where desired, the rigid member may be a wire mesh, scrim, woven or nonwoven web, and may be comprised of natural or synthetic fibers or composite materials. In an alternative embodiment, the rigid member may be bonded to the resilient member or molded in situ with the resilient material. It is preferable to secure the dampening means to the bearing member, thereby forming a unit of these two constituent parts. Optionally, the support member may be secured to the bearing member, so that the mount comprising the damper, the bearing plate, and the support member can be moved or positioned as an integral unit or structure.

In an alternative embodiment, each resilient member is comprised of a plurality of cushions or panels arranged in a common plane with alternating layers of rigid members. Preferably the cushions or panels have substantially planar surfaces, but where desired, may have a convex configuration as viewed in cross-section. The inwardly disposed marginal edges of each cushion or panel are preferably spaced apart from the inwardly marginal edges of adjacent cushions, which provide for expansion zones or grooves when the resilient cushion or panel is under load. In this embodiment, the cushions or panels for each layer may be of substantially equal area, or of different areas or different planar geometry, or of different physical properties.

The outwardly disposed marginal edges of the resilient members may be substantially co-terminus with the peripheral edge of the adjacent rigid member, which may be desirable when there is a relatively good or strong bond between the two members. In an alternative embodiment, the outward marginal edges of the resilient members are spaced inwardly from the periphery of the rigid members so that when a resilient member expands under load, the resilient member maintains full contact with the rigid member. Also, for any embodiment of the invention, one layer of the compressible resilient member or elastomer may differ from one or more of the other layers in composition, thickness, density, or compressive properties.

In another embodiment of the improved machinery mount of this invention, the resilient member comprises a plurality of resilient panels having opposed substantially planar surfaces. A first rigid member is bonded or molded in situ and directly to the uppermost planar surface of the lowermost panel and to opposed planar surfaces of the remaining resilient panels, described hereinbelow in greater detail. A second rigid member is then disposed or inserted between two first rigid members. Preferably, the outer marginal edges of the resilient panels and the first and second rigid members are co-terminus. In this manner, the several elements of the damper are easily aligned, thereby facilitating assemblage of the unit.

DETAILED DESCRIPTION OF THE INVENTION

Figure 1:
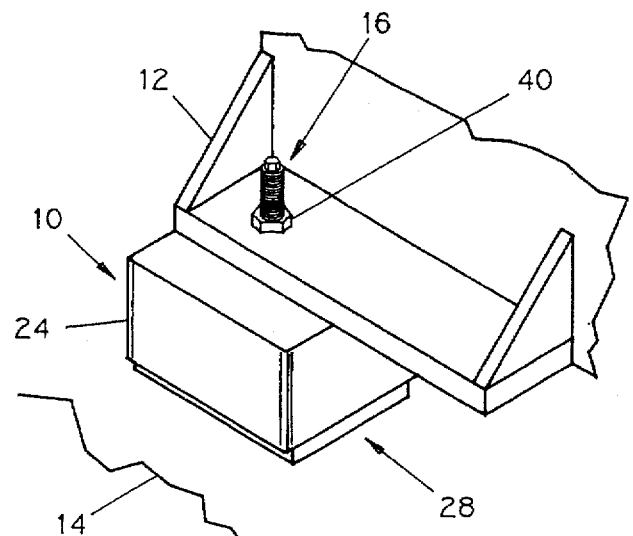
FIG. 1 is a diagrammatic, perspective view of a vibrational isolating mount for machinery used in conjunction with a machine footing and embodying the features of the present invention.
Figure 2:
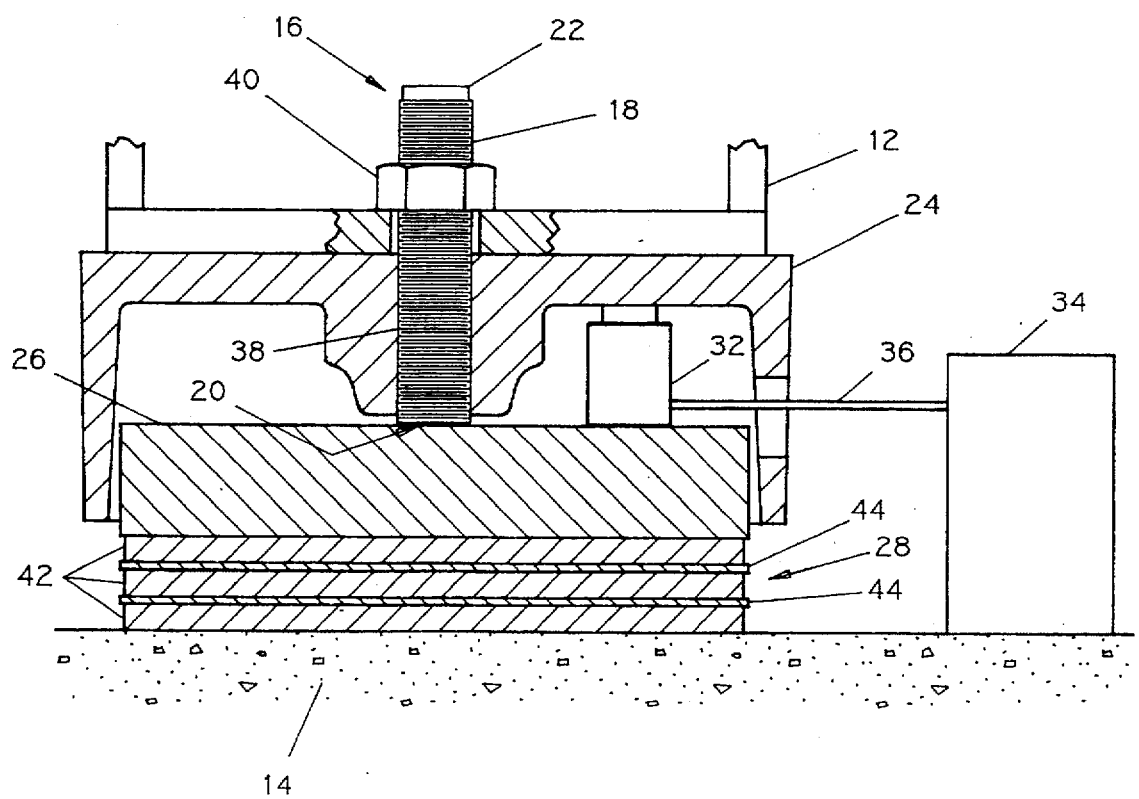
FIG. 2 is a fragmentary elevational view, partly in cross-section, illustrating the machinery mount of FIG. 1 in greater detail.

FIG. 1 diagrammatically illustrates an isolation mounting system for machinery which incorporates the features of the present invention. In the drawings, wherein like reference numerals designate similar parts throughout, there is illustrated in FIG. 1 a machinery mount, indicated generally by the numeral 10, such as to correct for out-of-level and/or out-of-flatness condition, and to absorb as much as possible shock and vibration forces. Load member 12, shown in fragmentary view, may be a corner foot of a heavy machine supported by an isolating mount, and is adjustably spaced relative to a base or substructure 14, such as the floor of a building, substantially as shown in U.S. Pat. Nos. 3,332,647 and 4,846,436, cited above. Although there is illustrated a single isolating mount, it should be understood that the same mount can be used at each of the various mounting points of a machine, e.g. at each of the four corner feet of a machine, for leveling and fine-tuning the distribution of support for the entire machine. An adjustment member, indicated generally by the numeral 16, as best seen in FIG. 2, adaptable for bearing the load, and having its longitudinal axis substantially transverse to the load member, comprises an externally threaded, cylindrical body portion or section 18 of a first diameter extending from a bearing portion 20 at the bottom end thereof and terminating at the top or upper portion with cylindrical shank or torquing member 22 of a reduced or second diameter. It will be observed that torquing member 22 may be formed integrally with the adjustment member 16 such as by machining as a unitary body from a single piece, or by forming the torquing member separately and connecting it to the body of member 16 by welding or bolting, all of which is within the skill of the art. Thus, torque applied to torquing member 22, as with a wrench or the like (not shown), is transferred to adjustment member 16, thereby rotating the adjustment member and correcting for out-of-level or out-of-flatness condition or effecting support distribution on the mounts, as explained below in greater detail.

Broadly, in such isolating mounting systems as shown in the drawings, the adjustment member 16 threadedly engages a supporting member 24 of sufficient size for supporting the load, e.g. machine footing 12. The bottom end 20 of the adjustment member 16 seats on the bearing member 26 spaced from the base or substructure 14 (e.g. floor) by a damping means or isolating damper, indicated generally by the numeral 28, and described below in detail. Where desired, a load-relieving means 32 (e.g., hydraulic jack) may be arranged in series as shown in FIG. 2, in that the load-relieving means is disposed intermediate the bearing member 26 (which is seated on damper 28) and the supporting member 24. The load-relieving means 32 is actuated in response to a signal transmitted to a motor operated pump 34 for delivering hydraulic fluid (e.g., oil), which is in fluid communication with the load-relieving means via conduit or line 36. Thus, a signal to the pump delivers pressurized hydraulic fluid to and from the load-relieving means. In operation, when an adjustment of the mount is required to correct for an out-of-level condition, the load-relieving means is actuated to relieve or remove at least a portion of the load from the adjustment member 16. The adjustment member then can be easily adjusted as by rotating the member in one direction or the other. When the condition is adjusted or corrected, the load-relieving means is deactivated, and the load returned to the adjustment member. It may be desirable to provide a load-relieving means arranged in parallel with the elements of the mount (i.e., damper 28 and bearing member 26) in that the load-relieving means is disposed between the base member 14 and the load member 12. An arrangement in series is sometimes found to be advantageous in that the machine foot 12 is not raised because there is no change of load on the damping means 28, and therefore no change of deflection (i.e., compression) of that member when the load-relieving means is actuated, and the adjustment member 16 remains in contact with the bearing member 26.

Figure 3:
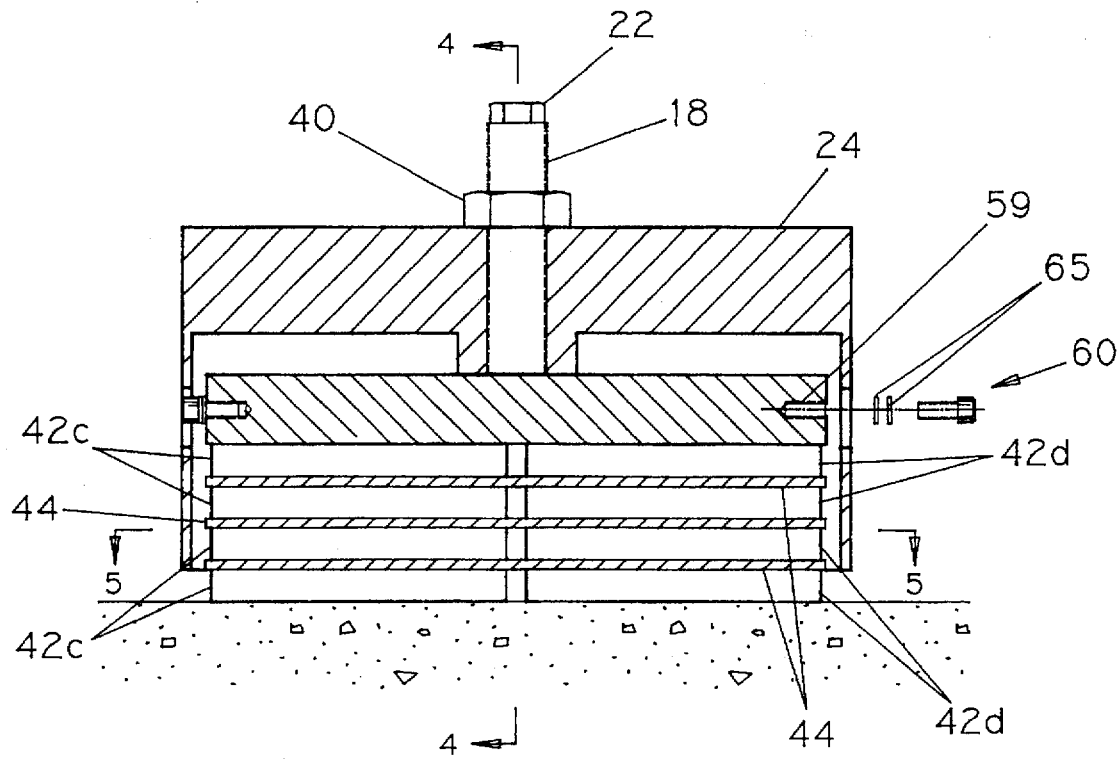
FIG. 3 is an enlarged, front elevational view, partly in cross-section, of a preferred embodiment of the isolating mount and showing details of the damping means.
Figure 4:
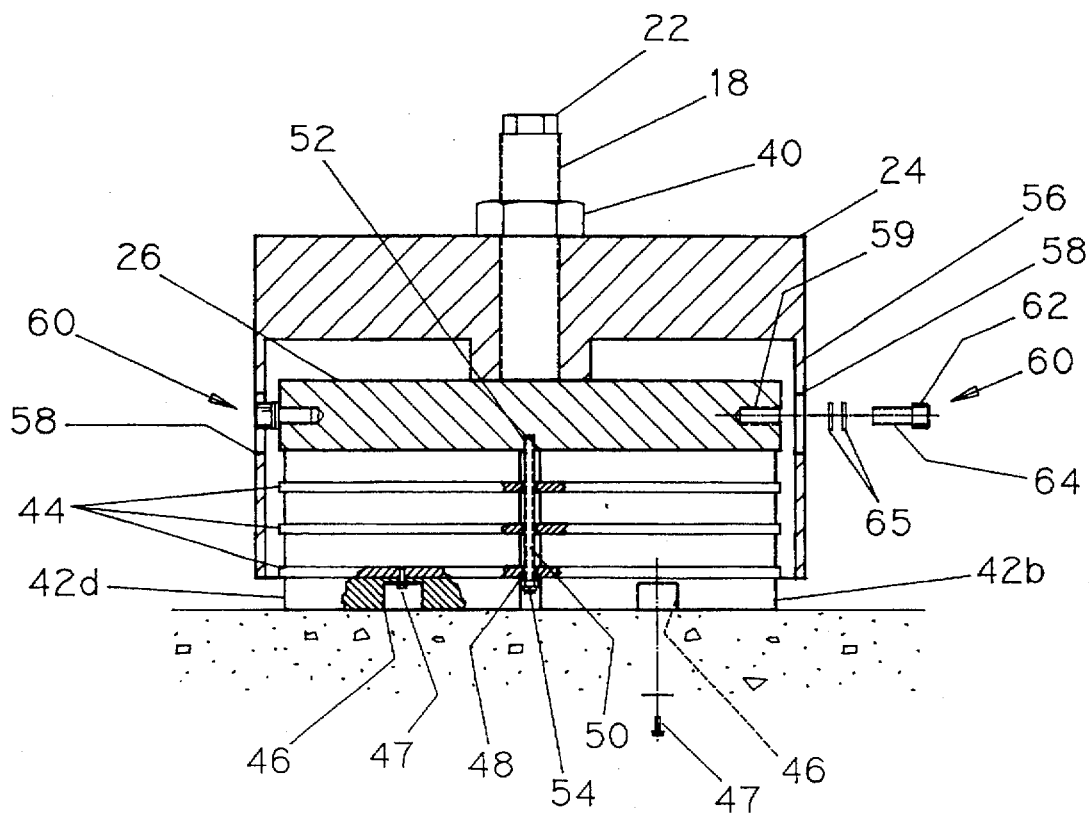
FIG. 4 is an enlarged, side elevational view, partly in cross-section, of the mount and damping means of FIG. 3 taken on line 4—4 of FIG. 3.

It should be understood, however, that a load-relieving means is optional, and this feature is not shown in the embodiments illustrated in FIGS. 3 and 4.

As shown in FIGS. 2, 3 and 4, an isolating machinery mount 10 incorporates a vibration damper 28 to absorb or lessen as much as possible vibration and shock forces. The damper 28 rests on the floor 14 of a building in which a piece of machinery is located so that one foot 12 of the machine may be positioned on the isolating mount 10. The damper 28 is disposed in immediate supporting relationship below the bearing member 26. A machinery supporting member or housing 24 is arranged or disposed above the bearing member 26, and normally is of sufficient size to support a foot 12 of a machine seated or engaged on the upper planar surface thereof. Supporting member 24 is provided with a centrally disposed threaded aperture 38 for threaded engagement with the externally threaded portion 18 of adjustment member 16. In this manner, adjustment member 16 is rotatably engagable with the supporting member 24. The bottom or bearing end 20 of adjustment member 16 abuts the top surface of the bearing member 26. It will be observed that upon rotation of the adjustment member 16, one can adjust or vary the spatial relationship or distance between the machinery supporting member 24 and the bearing member 26. A locking nut 40 is also provided to fix the adjustment member 16 in place relative to the machinery supporting member 24. It thus will be observed that the adjustment member 16 is seated at its lower end or bearing end 20 upon bearing member 26, and the threaded section 18 threadedly engages internally threaded aperture 38 of supporting member 24 for axial rotatable engagement. In this manner, adjustment member 16 is rotatable relative to the load member 12 and in fixed relation to the bearing member 26 and base or substructure 14. Thus rotation of adjustment member 16 will raise or lower load member 12 and thereby correct for out-of-level or out-of-flatness condition.

As stated above, and as shown in FIG. 2, the isolating mount 10 includes the supporting member 24 and bearing member 26 maintained in spaced relationship by the adjusting member 16. In accordance with the embodiment shown in FIG. 2, the damper 28, disposed on the base member 14, is positioned in immediate supporting relationship below the bearing member. The damping means 28 comprises a plurality of compressible resilient members 42 and at least one rigid member 44 in alternating relationship and being vertically arrayed, and preferably positioned in alignment with the bearing member 26. Although the dampening means comprises at least two resilient members and one intermediate rigid member, it should be understood that the number of members will depend upon the materials used in the damper, including the properties of the materials, and the type and operating characteristics of the machine. Also, the thickness for each member, both resilient and rigid, can be varied over a broad range, and the thickness for each can be varied from one layer to the next, depending largely upon the load capacity and and desired stiffness characteristics as well as the type and properties of the materials used in the damper structure. Where desired, each member or panel is bonded to the adjacent member with a suitable adhesive; that is, each resilient member is bonded to the adjacent rigid member. Adhesives for bonding these members are well known and readily available, and within the skill of the art, and include, for example, epoxy resins, acrylate resins, and vinyl resins.

It will be observed that the outer or end members (when viewed in a vertical array) of the dampening structure are the resilient members, so that the uppermost resilient member is disposed adjacent the bearing member and the lowermost resilient member is disposed adjacent the substructure or base. This feature is particularly advantageous in that (i) the resilient members being outwardly disposed will cushion the shock forces and enhance the dampening effect, (ii) the bearing member may not be in a precisely level or flat position or the substructure may not be smooth and even, and a resilient or compressible member will compensate for an uneven or bumpy floor, and (iii) the resilient member adjacent the floor grips the floor due to friction and thereby resists horizontal forces eliminating the need to fasten or bolt the unit to the substructure.

In a laminated or layered structure of the damper design or structure of this invention, the resilient material, exhibiting compressive properties, allows for damping thereby minimizing the transmission of vibrations and shock forces. The relatively more stiff and rigid member provides greater stability to the structure than provided with an elastomer only. However, a rigid member used alone will not absorb the vibrations and tends to resonate. Also, a vibration damper that is a single unit with a thickness equal to the sum of the individual layers of resilient members of a laminated structure tends to bulge more when the isolator assumes a load, and further has a more limited load capacity than the laminated structure. Hence, the combination of materials and properties used in the laminated damper of this invention provides for a stable construction that absorbs or lessens shock and vibration.

The resilient member may be of any suitable polymeric material, including, for example, rubber, synthetic rubber, plastic, or combinations thereof. Suitable materials include, for example, neoprene, polyethylene, nitrile rubber, Buna N rubber, butyl rubber, styrene-butadiene rubber, polypropylene, polyvinyl chloride, nylon, etc. These polymeric materials are well known in the art, and can be readily formulated to be sufficiently compressible, and further to be wear resistant and also resistant to oil, water, and oxidation. In this manner, the resilient member will exhibit a useful life in its normal environment. Generally, the thickness of the resilient member will range from about ¼ inch to about two inches, but this can vary depending largely on such factors as the design capacity and type and properties of the material used, and the desired stiffness characteristics.

The range of material properties for the resilient member and for the rigid member useful for the invention are as shown in the following table:

|  |  | Rigid Member | |
| --- | --- | --- | --- |
| Properties | Resilient Member | Plastic | Metal |
| Hardness | | | |
| Shore-A | 20–100 | | |
| Rockwell R | | 50–150 | |
| Brinell | | | 150–600 |
| Tensile Strength PSI | 500–4500 | 1,000–20,000 | 7,000–200,000 |
| Ultimate Elongation % | 300–700 | .3–60 | 10–65 |
| Modulus of Elasticity PSI | 150–18,000 | 750–65,000 | 10,000,000–30,000,000 |

The resilient member, formed of a rubber or polymeric material, typically compression molded, is resilient and capable of absorbing energy when contacted and deformed by a shock force. The rigid layer is formed of a harder and stiffer material than the resilient member to resist shock without tearing, but the resilient member should have sufficient strength so as not to tear apart which would happen if it were too soft. Thus, in practice, the rigid member always exhibits less lateral expansion under load than the resilient member.

In a preferred embodiment of the invention, the rigid member is a metal panel or sheet, such as steel or other suitable metal, but may comprise a metal or fabric mesh or scrim, which may be comprised of natural or synthetic fibers or composite materials. Metal is particularly advantageous in that it provides high stability to the structure, and the metal will not exhibit any substantial bending or stretching under a load. The metal, preferably as a panel or plate, should have a thickness of about 1/16 inch to about 1/2 inch, but this thickness can vary depending upon such factors as the number of members in a damper, the type of metal and elastomer, and the load capacity to be assumed by the mount.

It will be observed particularly from an examination of FIGS. 1 and 2 that the machinery supporting member 24 is spaced from the building floor 14 which supports the damper means 28. Thus, any vibrations transmitted from the floor 14 (or foundation) below the damper will be dampened and not fully transmitted to any equipment resting on the machinery supporting member. Similarly any vibration or impact forces generated by the operation of a machine resting on the supporting member will be only partially transmitted to the floor.

Figure 5:
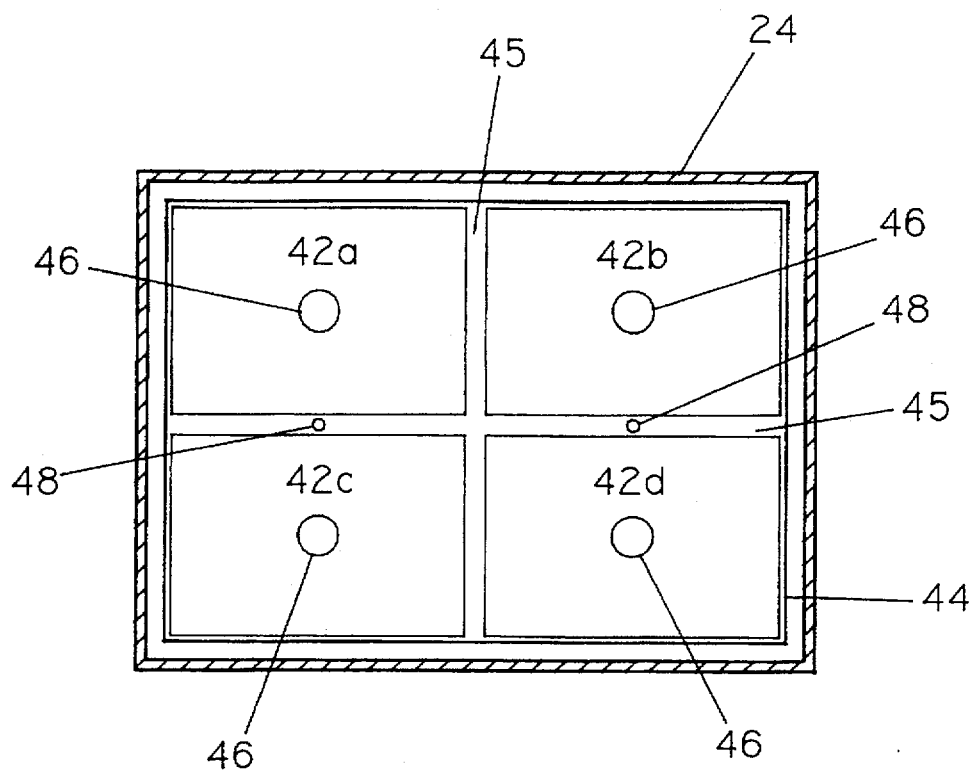
FIG. 5 is a plan view of the embodiment of FIG. 3 showing in detail the damper cushion and taken on line 5—5 of FIG. 3.

According to an alternative embodiment of the invention as shown in FIGS. 3, 4 and 5, the resilient member is comprised of a plurality of separate cushions or panels. Thus, as shown in the drawings, each resilient member 42 is comprised of four substantially planar cushions or panels 42a, 42b, 42c and 42d. The cushions are spaced apart, and arranged in a common plane with the inwardly disposed marginal edges of the cushions spaced apart, and the outwardly disposed marginal edges of each cushion terminate inwardly from the peripheral edges of the adjacent rigid member 44. Thus, when the mount assumes a load, the spaces formed between adjacent cushions or panels provide for expansion grooves 45 to allow for the resilient material to flow or bulge. Similarly, when the resilient cushions expand at the outer perimeter under load, the resilient member is maintained in contact with the rigid member and is supported by the area of the overhang of the rigid members, thereby preventing any bulge from drooping over the edge and impairing the integrity of the resilient member. In this embodiment and as best shown in FIG. 5, four cushions or panels comprise one layer of a resilient member 42 of damper 28, and the panels are symmetrically arranged in a quadrant and disposed adjacent the rigid member 44, but it should be understood that the layer of resilient member may have more or less individual panels, and the panels can be of equal area or have different areas. The cushions in this layer can have a different thickness or a different durometer to give different load ratings, or the cushions in one layer can be uniform in thickness and hardness, but can be different from the cushions in other layers. For example, the diagonally disposed cushions in the quadrant shown in FIG. 5 could have the same durometer but a different durometer from the other two cushions.

In an alternative embodiment of the invention, the lowermost resilient member 42 is provided with one or more recesses 46, which open downwardly. The recesses or cutaways provide space for the resilient material to bulge. That is, when the mount is acted upon by the load, the resilient member spreads and will bulge into the recesses. Where desired, additional resilient members may be provided with recesses, and it is desirable to provide the recesses in an equidistantly spaced relationship or pattern. Four recesses in any one resilient member is usually satisfactory, which are aligned and arranged symmetrically. Thus, as shown in FIGS. 3, 4, and 5, the resilient member 42 is comprised of four cushions or panels, and each lowermost cushion is provided with a recess 46. As stated above, it is preferable to bond each resilient member to the adjacent rigid member. It also may be desirable to mechanically fasten the lowermost resilient member to the adjacent rigid member, such as with a self-tapping screw 47, or other suitable fastening means, extending through the resilient member and engaged with the rigid member, as shown in FIG. 4.

In a still further embodiment of the invention, the rigid members 44 are provided with openings 48 for accommodating a fastening element 50. When the rigid members are laminated with the resilient members, the openings 48 are disposed in registry. A fastening element 50, such as a bolt, having an externally threaded end portion extends through the aligned openings 48 and is threadedly engaged with the internally threaded opening 52 in bearing member 26. If the resilient member comprises a plurality of cushions such as shown in FIGS. 3, 4, and 5, openings 48 are formed in the rigid members at the location of the expansion grooves 45, and a fastening element 50 extends through the aligned openings 48 and is engaged with the openings 52 in the bearing member 26. Nut 54 helps to retain the assembly damper 28 as a unit. Thus, upon assemblage of the damping means and connection to the bearing member, it therefore is easy to handle or move this substructure as an integral unit. The support housing 24 may be connected to this substructure in order to provide as an integral unit the support housing 24, bearing member 26 and damper 28. Such a unit or structure or machine mounting is advantageous in that the unit can be assembled and then installed for use as a machine mount, and the adjustment member 16 is then engaged and the machine leveled. In order to accomplish this, the downwardly depending side wall or skirt 56 of support member 24 is provided with a plurality of elongated slots or openings 58 having their longitudinal axis substantially parallel with the direction of load. Diametrically disposed radial holes 59, which are internally threaded, are located in the bearing member 26. An interlocking bolt 60 having head 62 and a threaded section 64 extends through the slot 58 and threadedly engages with threaded holes 59, thereby securing the members in assembled relation. One or more spacers 65 are used to properly adjust the position of the bolt so that the head of the bolt is substantially flush with the outer surface of skirt 56. It will be observed that the elongated slots 58 allow leveling adjustment between the support member 24 and the bearing member 26. Thus, turning the adjusting member 16 changes the distance between the support member 24 and the bearing member 26, and slot 58 allows for the displacement between the two members.

Figure 6:
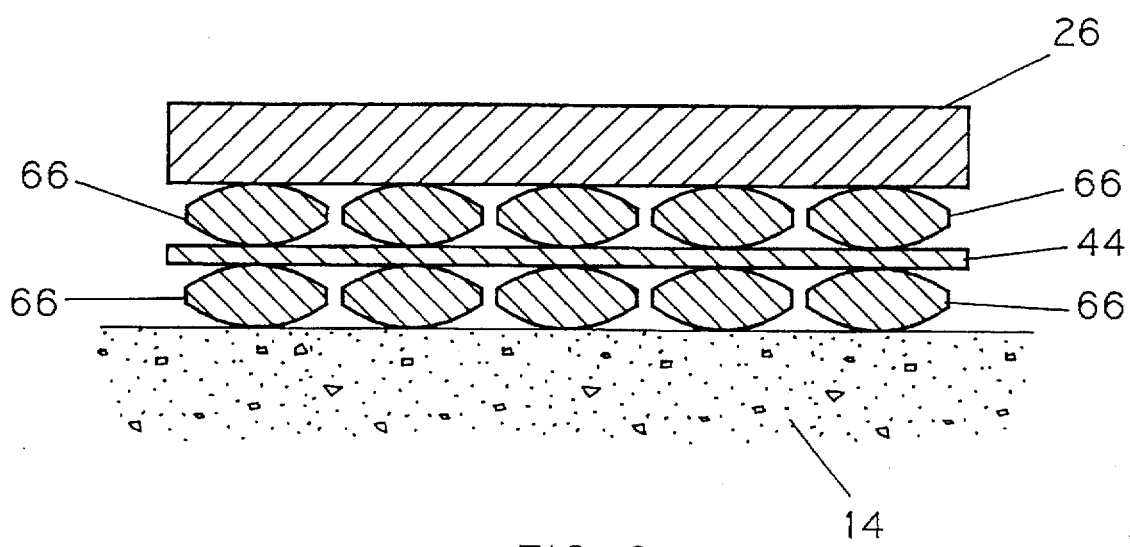
FIG. 6 is an elevational view, in cross-section, of an alternative embodiment of the present invention showing in detail the damper cushion.

In yet another embodiment, the resilient member can be non-planar as viewed in cross-section. As shown in FIG. 6, the resilient member or cushion is comprised of a plurality of elongated ribs 66 extending longitudinally the full length thereof, and the ribs may have a convex surface, as viewed in transverse cross-section, facing either or both of the adjacent members, as shown in the drawing. Further, each rib may be separate from the adjacent rib, or the ribs may be joined by a web (not shown). A resilient member having this configuration or pattern is disposed on each side of the rigid member 44. As a result of this configuration, the damping means provides a non-linear stiffness characteristic. Where desired, the resilient member or cushion may be comprised of separate or individual disks or briquettes, with an annular or rectangular circumference and with planar or convex top and/or bottom surfaces or facings. The individual members are arrayed in columns and rows, as viewed in plan, and may be joined or be in abutting relation, or may be spaced from each other. Each of the separate units could roll when under load, thereby providing for a lower horizontal stiffness.

Figure 7:
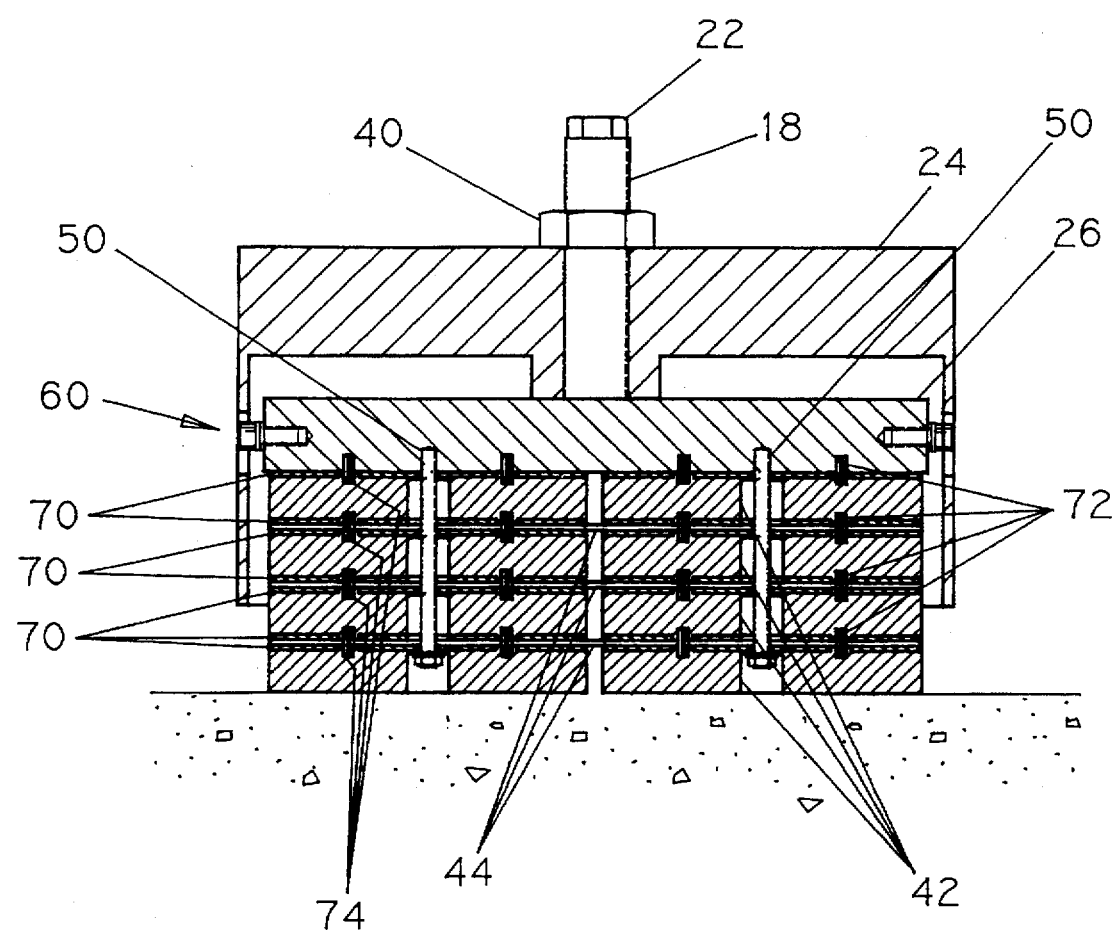
FIG. 7 is an elevational view, partly in cross-section, of another alternative embodiment of the invention.

In the embodiment shown in FIG. 7, the improved machinery mount comprises a plurality of resilient panels 28, substantially as described above. The resilient panels, being horizonatally disposed and vertically arrayed (in co-operation with the rigid members), have opposed (top and bottom) substantially planar surfaces. A first rigid member 70 is bonded or molded directly to the uppermost planar surface of the lowermost resilient panel and to opposed planar surfaces of the remaining resilient panels. Bonding a rigid member such as a metal plate to an elastomer is well known in the art, and typically includes priming the metal surfaces, applying a bonding agent mutually adhesive to both the metal and the elastomer, and then compression molding the unit under heat and pressure. This bonding feature increases the stiffness of the elastomer for its size, which allows more load to be placed on the same size mount. The second rigid members 44 are disposed or inserted between two first rigid members 70 and thus between adjacent layers of resilient panels, as shown in FIG. 7. The rigid members 44 and 70 are adjoined as by a pin 72 extending through aligned holes 74 and forced or pushed into the layers of adjacent resilient panels. Similarly, the uppermost resilient panel with bonded rigid member 70 is adjoined to the bearing member 26 by means of a pin 72 extending through aligned holes in the rigid members and bearing member and forced into the resilient panel. It will be observed, however, that the aligned holes in rigid members 70 are larger in diameter than the pin 72 thereby providing a clearance which facilitates assembly. Preferably, both rigid members 44 and 70 are metal (e.g., steel, about 1/16 inch to ½ inch thick, preferably ¼ inch thick), and pin 72 helps to prevent or inhibit slippage and maintain alignment. The damper elements are connected to the bearing member 26 by fastening element 50, which also may be connected to the supporting member 24 by interlocking bolt 60, substantially as described above.

Any exposed surfaces of the damper, especially the resilient member, can be attacked by chemicals, lubricants, and the like, which adversely affects the elastomer and the elastomer's stiffness properties. Adjoining the members, as described above and shown in FIG. 7, is advantageous in that it prevents exposure of the damper elements to these chemicals. Also, it is preferable that the outer marginal edges of the elastomer and rigid members are co-terminus, and because of the strong bond formed in the structure, there is little or no protrusion of the elastomer beyond the edges of the rigid members when under pressure. This feature facilitates alignment of the several elements of the damper thereby making it easier to assemble the damper.

As a result of the present invention there is provided an improved machinery mount having numerous advantages, including a prolonged life as compared to similar prior art isolators; ability to assume increased load capacity, yet provide lesser stiffness and hence more isolation; and being able to use relatively thin resilient members or elastomers, and with a minimized volume thereby diminishing their exposure to destructive materials such as oil, light or ozone.

It should be understood that the foregoing detailed description has been given for clearness of understanding only, and no unnecessary limitations should be understood therefrom, as modifications will be obvious to those skilled in the art.

What is claimed is:

1. An improved machinery mount for supporting at least a portion of a load on a substructure, comprising: (a) a support member adopted to be engaged with at least a portion of said load; (b) a bearing member disposed beneath said support member and spaced therefrom; (c) means for maintaining said spaced relationship between said support member and said bearing member; and (d) damping means for disposition between said bearing member and said substructure, said damping means comprising a plurality of compressible resilient members and a rigid member interposed between said resilient members and being vertically arrayed, the uppermost resilient member disposed adjacent said bearing member and the lowermost resilient member disposed adjacent said substructure.

2. An improved machinery mount according to claim 1 further including means for bonding said resilient members to the adjacent rigid members.

3. An improved machinery mount according to claim 1 or claim 2 further including means for securing said damping means to said bearing member.

4. An improved machinery mount according to claim 3 further including means for securing said support member to said bearing member.

5. An improved machinery mount according to claims 1 or 2 wherein each of said resilient members comprises a plurality of resilient panels having substantially planar surfaces and arranged in a common plane with the inwardly disposed marginal edges of said panels spaced apart and the outwardly disposed marginal edges of each panel terminating inwardly of the peripheral edge of the adjacent rigid member.

6. An improved machinery mount according to claim 5 wherein said resilient panels are of substantially equal load bearing area.

7. An improved machinery mount according to claims 1 or 2 wherein said resilient member is a polymeric material and said rigid member is metal.

8. An improved machinery mount according to claim 7 wherein said resilient member is neoprene and said rigid member is a steel panel.

9. An improved machinery mount according to claims 1 or 2 wherein at least one of said resilient members is provided with at least one downwardly disposed recess.

10. An improved machinery mount according to claim 9 wherein said lowermost resilient member has at least four spaced apart recesses symmetrically arranged.

11. An improved machinery mount according to claim 5 wherein said resilient panels are provided with at least one downwardly disposed recess.

12. An improved machinery mount according to claim 5 wherein said resilient member is a polymeric material and said rigid member is metal.

13. An improved machinery mount according to claim 12 wherein said resilient member is selected from the group consisting of neoprene, neoprene/styrene-butadiene blend, and nitrile rubber, and said rigid member is a steel panel.

14. An improved machinery mount according to claim 12 wherein said resilient member is selected from the group consisting of neoprene, neoprene/styrene-butadiene blend, and nitrile rubber, and said rigid member is selected from the group consisting of polystyrene, nylons, acrylics, and phenolics.

15. An improved machinery mount according to claim 1 wherein each of said resilient members comprises a plurality of resilient panels of a polymeric material having substantially planar surfaces and arranged in a common plane with the inwardly disposed marginal edges of said panels spaced apart and the outwardly disposed marginal edges of each panel terminating inwardly of the peripheral edge of the adjacent rigid member of a metal; means for bonding said resilient panels to the adjacent rigid members; means for securing said damping means to said bearing member; and means for securing said support member to said bearing member.

16. An improved machinery mount according to claim 15 wherein the resilient panels comprising the lowermost resilient member disposed adjacent said substructure are provided with at least one downwardly disposed recess.

17. An improved machinery mount according to claim 1 wherein said resilient member comprises a plurality of resilient panels having opposed substantially planar surfaces, and further including a first rigid member bonded directly to the uppermost planar surface of said lowermost panel and to opposed planar surfaces of the remaining resilient panels, and a second rigid member disposed between two first rigid members.

18. An improved machinery mount according to claim 17 wherein said first rigid member is compression molded directly to said planar surfaces of said resilient panels.

19. An improved machinery mount according to claim 17 wherein the outwardly marginal edges of each of said resilient panels are substantially co-terminus with the outwardly marginal edges of each of said first and second rigid members.

20. An improved machinery mount according to claim 17 wherein said resilient panels are a polymeric material and said first and second rigid members are metal.

21. An improved machinery mount according to any one of claims 17, 18, 19, or 20 wherein each of said resilient members comprises a plurality of resilient panels arranged in a common plane with the inwardly disposed marginal edges of said panels spaced apart.

22. An improved machinery mount according to claim 21 wherein said resilient member is selected from the group consisting of neoprene, neoprene/styrene-butadiene blend, and nitrile rubber, and said rigid members are steel panels.

23. An improved machinery mount according to claim 21 wherein said lowermost resilient panels are provided with at least one downwardly disposed recess.

24. An improved machinery mount according to any one of claims 17, 18, 19, or 20 wherein at least one of said resilient panels is provided with at least one downwardly disposed recess.

25. An improved machinery mount according to claim 24 wherein said lowermost resilient panel has at least four spaced apart recesses symmetrically arranged.

26. An improved mount for supporting at least a portion of a load on a substructure, comprising: (a) a support member adopted to be engaged with at least a portion of said load; (b) a bearing member disposed beneath said support member; (c) an adjustable member having a portion intermediate said support member and said bearing member for regulating and maintaining the spatial relationship between said bearing member and said support member; (d) damping means for disposition between said bearing member and said substructure, said damping means comprising a plurality of compressible resilient members and a plurality of metal members interposed between said resilient members and being vertically arrayed to be in alignment with said bearing member, the uppermost resilient member disposed adjacent said bearing member and the lowermost resilient member disposed adjacent said substructure, at least the lowermost resilient member having a plurality of downwardly disposed recesses; and (e) means for securing said damping member to said bearing member.

27. An improved machinery mount according to claim 26 further including means for bonding said resilient members to adjacent metal members.

28. An improved machinery mount according to claim 26 wherein each of said resilient members comprises a plurality of resilient panels having substantially planar surfaces and arranged in a common plane with the inwardly disposed marginal edges of said panels spaced apart and the outwardly disposed marginal edges of each panel terminating inwardly of the peripheral edge of the adjacent rigid member.

29. An improved machinery mount according to any one of claims 26–28 further including means for securing said support member to said bearing member.

* * * * *